Sept. 6, 1949. J. M. BETTENDORF 2,480,897
POTATO PLANTER
Filed April 3, 1948 3 Sheets-Sheet 1
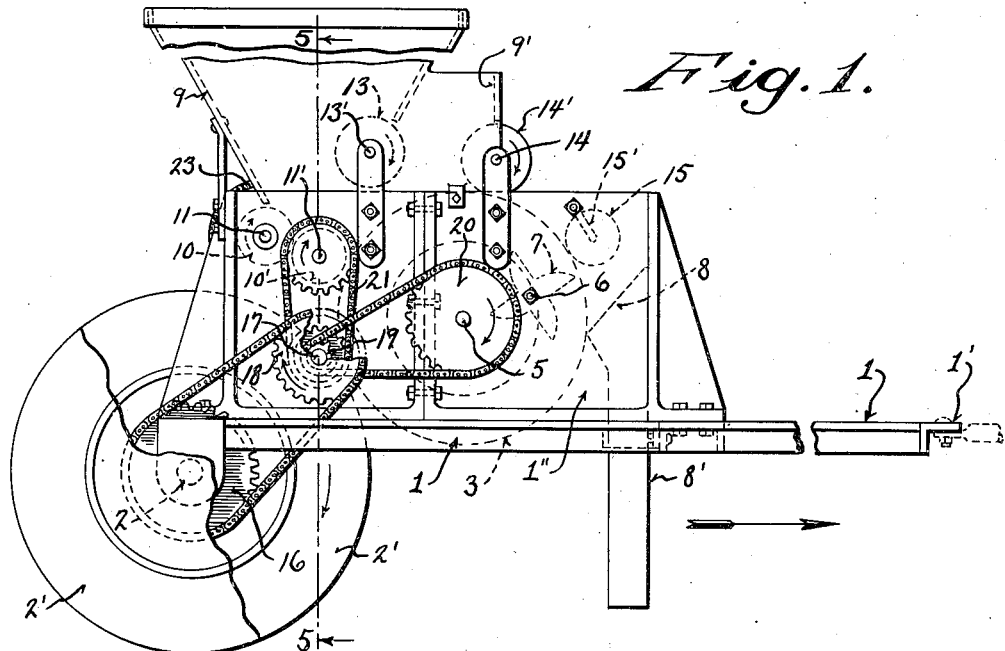
Fig. 1.
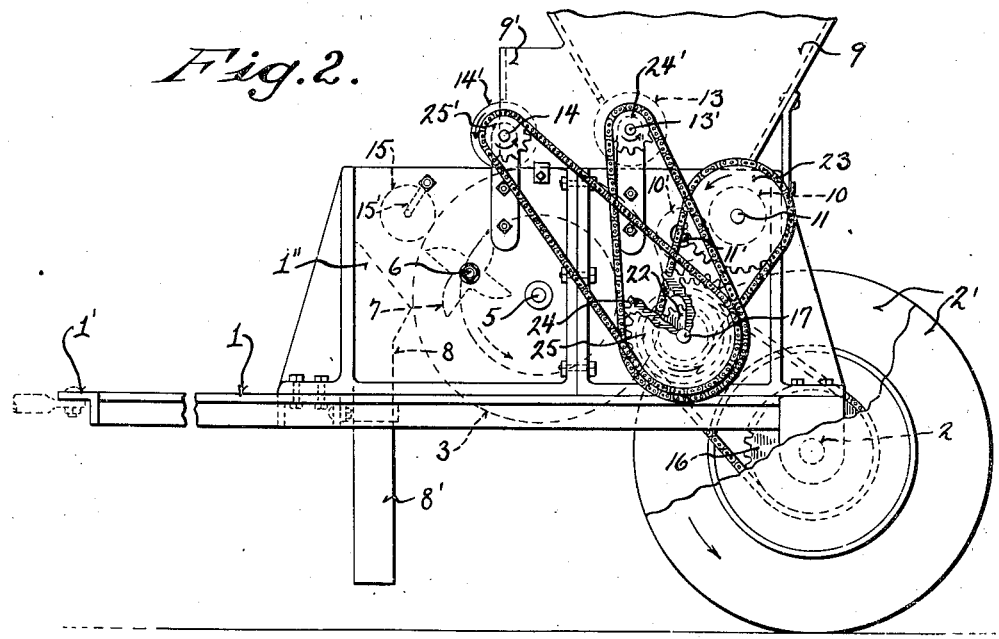
Fig. 2.
INVENTOR
JACOB M. BETTENDORF
ATTORNEYS Sept. 6, 1949. J. M. BETTENDORF 2,480,897
POTATO PLANTER
Filed April 3, 1948 3 Sheets-Sheet 2

INVENTOR
JACOB M. BETTENDORF
BY
ATTORNEYS

Sept. 6, 1949.  J. M. BETTENDORF  2,480,897
POTATO PLANTER

Filed April 3, 1948  3 Sheets-Sheet 3

INVENTOR
JACOB M. BETTENDORF

BY

ATTORNEYS

Patented Sept. 6, 1949

2,480,897

UNITED STATES PATENT OFFICE 2,480,897

POTATO PLANTER

Jacob M. Bettendorf, Milwaukee, Wis., assignor to Milton B. Muehl, Milwaukee, Wis.

Application April 3, 1948, Serial No. 18,771

1 Claim. (Cl. 222—9)

My invention refers to power driven potato planters, and it has for its object to provide a simple, positive and accurately spaced feed for seed potatoes. This is accomplished by a rotary pocketed delivery wheel having ejector armed wheels meshed therewith, whereby each potato section is stripped from a pocket and delivered to a planter boot, it being understood that the delivery wheel has a pair of pocketed faces staggered relative to each other whereby the said potatoes are alternately dropped from the two pocketed faces of the delivery wheel.

The mechanism also includes a main and an auxiliary hopper, associated with a series of feeding and agitating rollers, whereby in the event one of the delivery wheel pockets fails to receive a seed, thereafter, the auxiliary hopper will supply the empty pocket with a seed potato. Thus, a uniform planting of seed potatoes is automatically insured. It is further understood that the planter may be of the trailer type or directly motor driven, under some conditions.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 is a side elevation of a potato planter embodying the features of my invention.

Figure 2 is another elevation looking from the opposite side of the planter.

Referring by characters to the drawings, I indicates a frame, converging arms of which terminate with a tractor hitch I'. The rear end of the frame has mounted thereon an axle 2, which axle carries supporting wheels 2'. The frame also has projecting from its base portion a pair of panels I", each of which panels are fabricated in flange sections, secured by bolts, whereby the front section, for convenience in assemblage, is separable from the rear panel sections.

Fitted between the frame panels is a double faced delivery wheel 3 and extending from its opposite faces are a series of radially disposed pockets 4 having curved bottom walls, as shown. Each series of pockets is centrally interrupted by an arcuate slot 4', which slot terminates below the peripheral edges of the pockets to form gear teeth 4".

Figure 3:
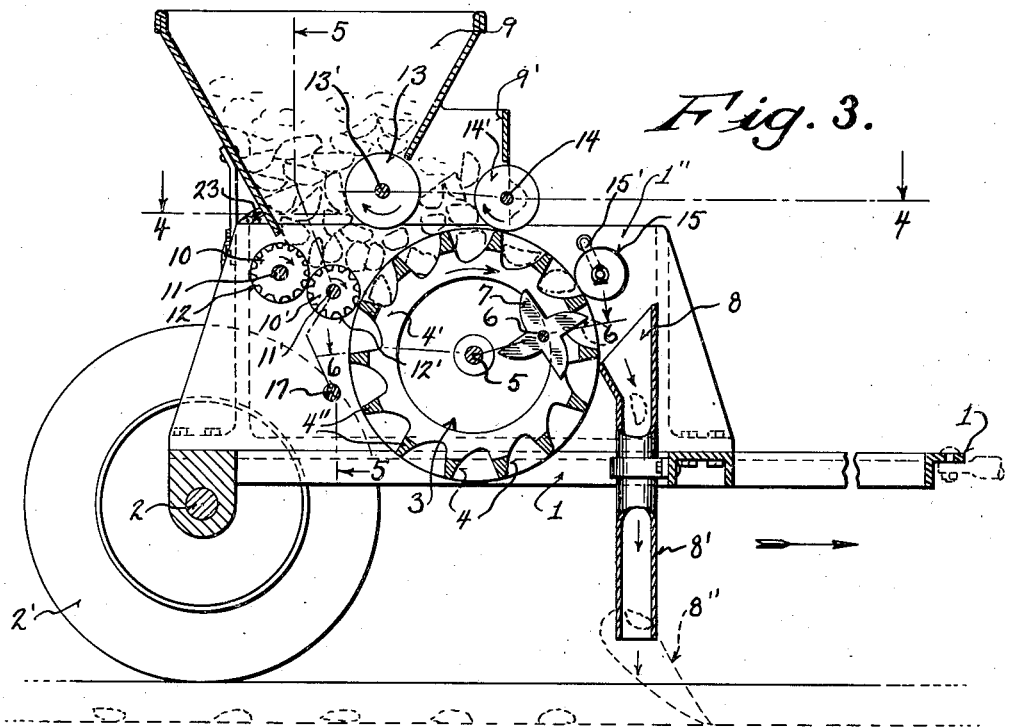
Figure 3 is a longitudinal, sectional elevation of the planter, the section being indicated by line 3—3 of Figure 4.
Figure 6:
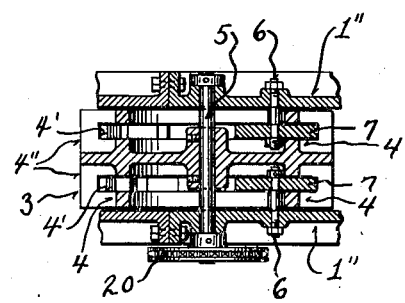
Figure 6 is a fragmentary, sectional, plan view through a portion of the frame and a pocketed delivery wheel mechanism, the section being indicated by line 6—6 of Figure 3.
Figure 8:
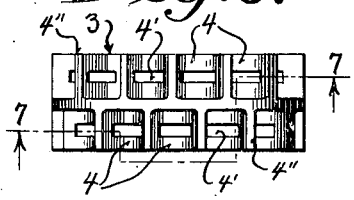
Figure 8 is a plan view of the delivery wheel.

The central hub of the delivery wheel is secured to a shaft 5 that is suitably journaled in the frame panels. The panels I" are each provided with stud shafts 6, which stud shafts extend inwardly under the wheel pockets and have loosely mounted thereon a pair of armed ejector wheels 7, as best indicated in Figures 3 and 6 of the drawings. These ejector wheels are nested in the pocket slots whereby their arms are engaged by the teeth 4" of the pockets to thus impart rotation to the ejector wheels, whereby seed potatoes nested therein are positively discharged or stripped from the pockets 4, as indicated in dotted lines in Figure 1.

The discharged seed potatoes are delivered to the mouth 8 of a boot 8' that is suitably secured to the front portion of the frame, and the lower end of said boot carries the usual planter shovel 8", as illustrated in Figure 3 of the drawings.

Mounted upon the frame panels I" is a main hopper 9 positioned rearwardly of the pocketed delivery wheel. The discharge mouth of this hopper has fitted thereunder a pair of feeding and agitating rollers 10 and 10', which rollers direct the seed potatoes into the delivery wheel pockets. The rollers are secured to shafts 11 and 11', which shafts are suitably journaled in the frame panels.

It will be noted that the rear roller 10 is centrally divided and each section thereof is formed with inwardly inclined right and left spiral fins 12, which fins are associated with similar right and left spiral fins 12' of roller 10', the same being inclined from the center of the roller 10' but in the opposite direction, whereby seed potatoes dropped upon the pair of rollers will first be discharged from the roller 10 towards the center, and thereafter, when said seed potatoes engage the faces of the second roller 10', they will be scattered outwardly from the center of said roller to insure that a potato seed will be deposited in a pair of empty pockets of the delivery wheel as the same revolve past the feed and agitating rollers and fail to load.

Figure 4:
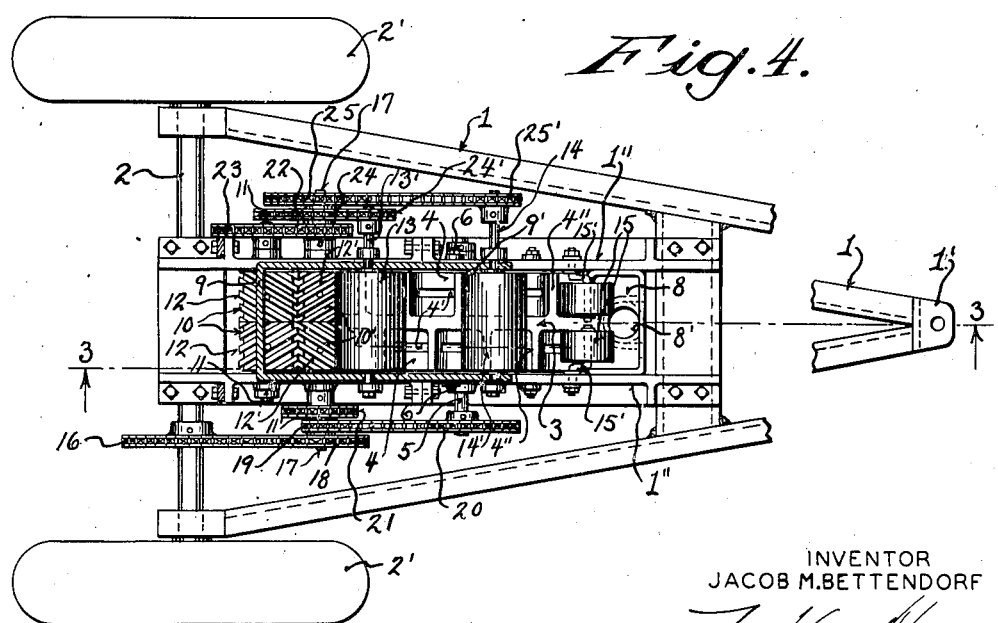
Figure 4 is a plan, sectional view of the machine, the section being indicated by line 4—4 of Figure 3.

The front wall of the hopper 9 is interrupted, and the same communicates with an auxiliary hopper 9', the same being in advance of the main hopper and directly over the delivery wheels. To insure uniform feed of the seed potatoes, the interrupted front wall of the main hopper 9 carries an agitator wheel 13, which wheel is journaled upon a shaft 13' that is mounted in the side walls of the main hopper. The auxiliary hopper 9' also has journaled therein a shaft 14, which shaft carries an auxiliary agitating wheel 14', as best indicated in Figures 3 and 4 of the drawings.

In order to prevent premature displacement of the seed potatoes from the wheel pockets, I provide a pair of gravity controlled rollers 15 that are mounted upon crank pins 15' which are loosely pivoted to the panels.

As best indicated in Figures 1 and 2 of the drawings, the pocketed delivery wheel and agitator rollers are driven from a sprocket wheel 16 mounted upon the axle 2. This sprocket wheel 16 imparts drive to a countershaft 17 journaled in the frame panels, and one end of this shaft carries a sprocket 18 in chain belt connection with the axle sprocket wheel. The countershaft 17 also carries a pinion 19 in chain belt connection with a sprocket wheel 20, which sprocket wheel is mounted upon the shaft 5 of the delivery wheel 3, whereby due to this back gear connection, the speed of the delivery wheel is slowed down.

Figure 5:
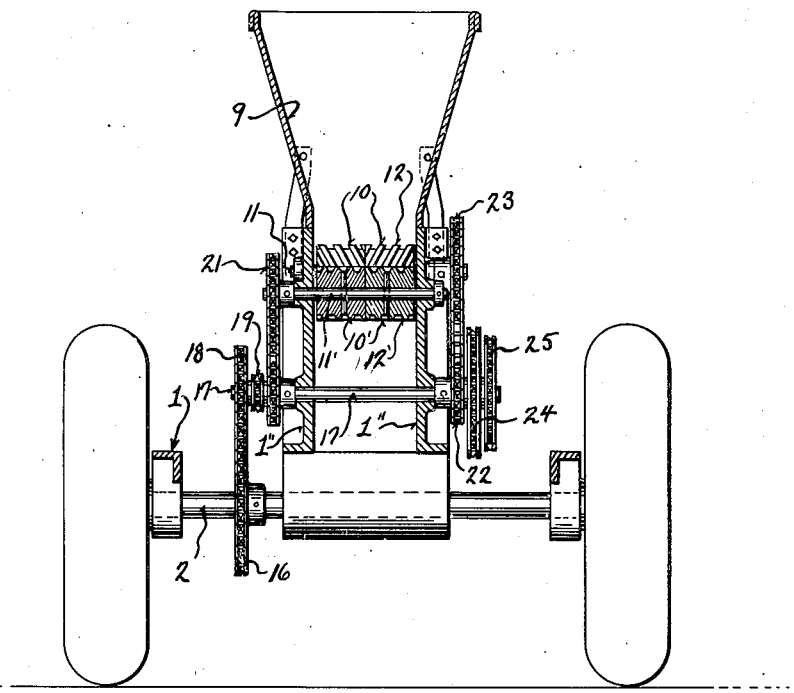
Figure 5 is a cross sectional view of the machine, the section being indicated by line 5—5 of Figure 3.
Figure 7:
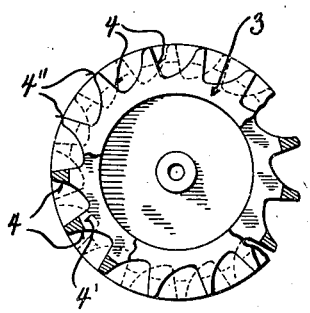
Figure 7 is a face view of the delivery wheel with parts broken away and in section to more clearly illustrate structural features, the section being indicated by line 7—7 of Figure 8.

Rotative power from the countershaft 17 is imparted to the shaft 11' of the agitator wheel 10' by a chain 21 and sprocket wheel connection between the countershaft and the roller shaft, all of which gear connections are best illustrated in Figures 1 and 5 of the drawings.

Referring now to Figures 2 and 5 of the drawings, the opposite end of the countershaft 17 carries a pinion 22, which pinion is in chain belt connection with a sprocket wheel 23 secured to the end of the rear agitator roller shaft 11. A second sprocket wheel 24 carried by the countershaft 17 is in chain belt drive with a sprocket pinion 24' that is mounted upon the shaft 13' of the agitator wheel 13. To complete the drive gear connections a third sprocket wheel 25 is secured to the countershaft 17, and the said sprocket wheel is in chain belt connection with a sprocket pinion 25', which pinion is secured to the shaft 14 of the auxiliary hopper agitator roller 14'.

With reference to the gear driving connection, it will be observed that the entire feed mechanism of the potato planter is driven from the countershaft 17 which receives its power from the wheel carrying axle 2.

From the foregoing description, it is apparent when the planter is in operation, seed potatoes will be delivered from the hopper to the pockets of the delivery wheel 3, and in the event one set of pockets fails to receive a seed potato when said empty pockets travel under the auxiliary hopper, the agitated seed potatoes therein will quickly fill the empty pockets so as to insure that all pockets will positively deliver a seed potato into the ground as indicated in dotted lines of Figure 1, the seed potatoes being equally spaced apart and suitably buried by the shovel or plow associated with the lower end of the boot 8'.

I claim:

In a trailer potato planter having a frame, a rear wheel carrying axle for supporting the frame, and side panels extending upwardly from said frame; the combination of a delivery wheel nested between the panels, a driving shaft secured to the wheel journaled in the panels, a series of pockets extending from opposite faces of the delivery wheel, arcuate slots intersecting the bottom of the pockets terminating below the top edge of the same forming gear teeth, fixed studs extending inwardly from the frame panels under the wheel pockets, ejector armed wheels loosely mounted upon the studs and rotatable within the arcuate slots intersecting the bottom of the pockets for engaging the pocket gear teeth, a feed boot communicating with the pockets of the delivery wheel adjacent to the armed ejector wheels, a main hopper mounted upon the frame panels rearwardly of the pocketed wheel, an agitator roller under the hopper having a shaft journaled in the panels, the agitator roller having spiral right and left teeth inclined towards the center thereof, a second agitator roller associated with the first mentioned agitator roller adjacent to the wheel pockets, the periphery of said second agitator roller having spiral teeth inclined in the opposite direction from its center and at reversed angles from the first mentioned agitator roller, a shaft for said second roller journaled in the panels, an auxiliary hopper in communication with the main hopper and positioned over the pocketed wheel, an agitator roller having a shaft journaled in the walls of the auxiliary hopper, and chain and sprocket driving gears between the shaft of said agitator rollers and pocketed wheel.

JACOB M. BETTENDORF.

REFERENCES CITED

The following references are of record in the file of this patent:

UNITED STATES PATENTS

| Number | Name | Date |
|---|---|---|
| 1,168,859 | Compton | Jan. 18, 1916 |
| 1,452,912 | Hartenstein | Apr. 24, 1923 |
| 1,997,791 | Hoberg et al. | Apr. 16, 1935 |